(12) United States Patent
Fan et al.

(10) Patent No.: US 11,803,984 B2
(45) Date of Patent: Oct. 31, 2023

(54) OPTIMAL VIEW SELECTION IN A TELECONFERENCING SYSTEM WITH CASCADED CAMERAS

(71) Applicant: PLANTRONICS, INC., Santa Cruz, CA (US)

(72) Inventors: Yongkang Fan, Beijing (CN); Hai Xu, Beijing (CN); Wenxue He, Beijing (CN); Hailin Song, Beijing (CN); Tianran Wang, Beijing (CN); Xi Lu, Beijing (CL)

(73) Assignee: PLANTRONICS, INC., Santa Cruz, CA (US)

( * ) Notice: Subject to any disclaimer, the term of this patent is extended or adjusted under 35 U.S.C. 154(b) by 202 days.

(21) Appl. No.: 17/310,571

(22) PCT Filed: Jun. 4, 2020

(86) PCT No.: PCT/CN2020/094294
§ 371 (c)(1),
(2) Date: Aug. 11, 2021

(87) PCT Pub. No.: WO2021/243633
PCT Pub. Date: Dec. 9, 2021

(65) Prior Publication Data
US 2022/0319032 A1    Oct. 6, 2022

(51) Int. Cl.
*G06T 7/70* (2017.01)
*G10L 25/78* (2013.01)
*H04L 65/403* (2022.01)

(52) U.S. Cl.
CPC ............... *G06T 7/70* (2017.01); *G10L 25/78* (2013.01); *G06T 2207/10016* (2013.01); *G06T 2207/30201* (2013.01); *H04L 65/403* (2013.01)

(58) Field of Classification Search
None
See application file for complete search history.

(56) References Cited

U.S. PATENT DOCUMENTS 9,986,360 B1 *   5/2018   Aas .................. H04M 3/569
10,027,883 B1 *  7/2018   Kuo .................. H04N 23/63
(Continued)

FOREIGN PATENT DOCUMENTS

CN   105611167 A   5/2016
CN   107613243 A   1/2018
(Continued)

OTHER PUBLICATIONS

International Search Report and Written Opinion dated Feb. 25, 2021 for PCT/CN2020/094294.

*Primary Examiner* — Stella L. Woo
(74) *Attorney, Agent, or Firm* — QUARLES & BRADY LLP

(57) ABSTRACT

A method (1000) for operating cameras (202) in a cascaded network (100), comprising: capturing a first view (1200) with a first lens (326) having a first focal point (328) and a first centroid (352), the first view (1200) depicting a subject (1106); capturing a second view (1202) with a second lens (326) having a second focal point (328) and a second centroid (352); detecting a first location of the subject (1106), relative the first lens (326), wherein detecting the first location of the subject (1106), relative the first lens (326), is based on audio captured by a plurality of microphones (204); estimating a second location of the subject (1106), relative the second lens (326), based on the first location of the subject (1106) relative the first lens (326); selecting a portion (1206) of the second view (1202) as depicting the subject (1106) based on the estimate of the second location of the subject (1106) relative the second lens (326).

21 Claims, 12 Drawing Sheets

(56) References Cited

U.S. PATENT DOCUMENTS

| | | | |
|---|---|---|---|
| 2008/0218582 A1* | 9/2008 | Buckler | H04N 7/15 348/E7.083 |
| 2011/0285808 A1 | 11/2011 | Feng et al. | |
| 2012/0293606 A1* | 11/2012 | Watson | H04N 23/60 348/E7.085 |
| 2016/0134838 A1* | 5/2016 | Tangeland | H04N 7/152 348/14.09 |
| 2017/0133036 A1 | 5/2017 | Cohen et al. | |

FOREIGN PATENT DOCUMENTS

| | | |
|---|---|---|
| KR | 101508092 B1 | 4/2015 |
| WO | 2012161089 A1 | 11/2012 |

* cited by examiner

OPTIMAL VIEW SELECTION IN A TELECONFERENCING SYSTEM WITH CASCADED CAMERAS

TECHNICAL FIELD

This disclosure relates generally to videoconferencing and relates particularly to controlling cameras in a cascaded system at a videoconferencing endpoint.

BACKGROUND

During a videoconference, people at a videoconferencing endpoint interact with people at one or more other videoconferencing endpoints. There exist systems to capture images of conference participants from different angles. Attempts to create systems which automatically select the optimal view from a plurality of views captured by non-homogeneous camera devices have not been wholly satisfactory. Thus, there is room for improvement in the art.

SUMMARY

An example of this disclosure includes a method for operating cameras in a cascaded network, comprising: capturing a first view with a first lens having a first focal point and a first centroid, the first view depicting a subject; capturing a second view with a second lens having a second focal point and a second centroid; detecting a first location of the subject, relative the first lens, wherein detecting the first location of the subject, relative the first lens, is based on audio captured by a plurality of microphones; estimating a second location of the subject, relative the second lens, based on the first location of the subject relative the first lens; selecting a portion of the second view as depicting the subject based on the estimate of the second location of the subject relative the second lens.

Another example of this disclosure includes a teleconferencing system, comprising: a system camera comprising a first lens with a first focal point and a first centroid, the system camera configured to capture a first view containing a subject; a microphone array; and a processor coupled to the system camera and the microphone array, wherein the processor is configured to: determine a first location of the subject, relative the first lens, based on audio captured using the microphone array; receive a video stream from a releasably connected camera, the video stream corresponding to a second view with a second lens having a second focal point and a second centroid; estimate a second location of the subject, relative the second lens, based on the first location of the subject relative the first lens; and determine, based on the estimate of the second location of the subject relative the second lens, a portion of the video stream as depicting the subject.

Another example of this disclosure includes a non-transitory computer readable medium storing instructions executable by a processor, wherein the instructions comprise instructions to: capture a first view with a first lens having a first focal point and a first centroid, the first view depicting a subject; capture a second view with a second lens having a second focal point and a second centroid; detect a first location of the subject, relative the first lens, wherein detecting the first location of the subject, relative the first lens, is based on audio captured by a plurality of microphones; estimate a second location of the subject, relative the second lens, based on the first location of the subject relative the first lens; select a portion of the second view as depicting the subject based on the estimate of the second location of the subject relative the second lens.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

Figure 1:
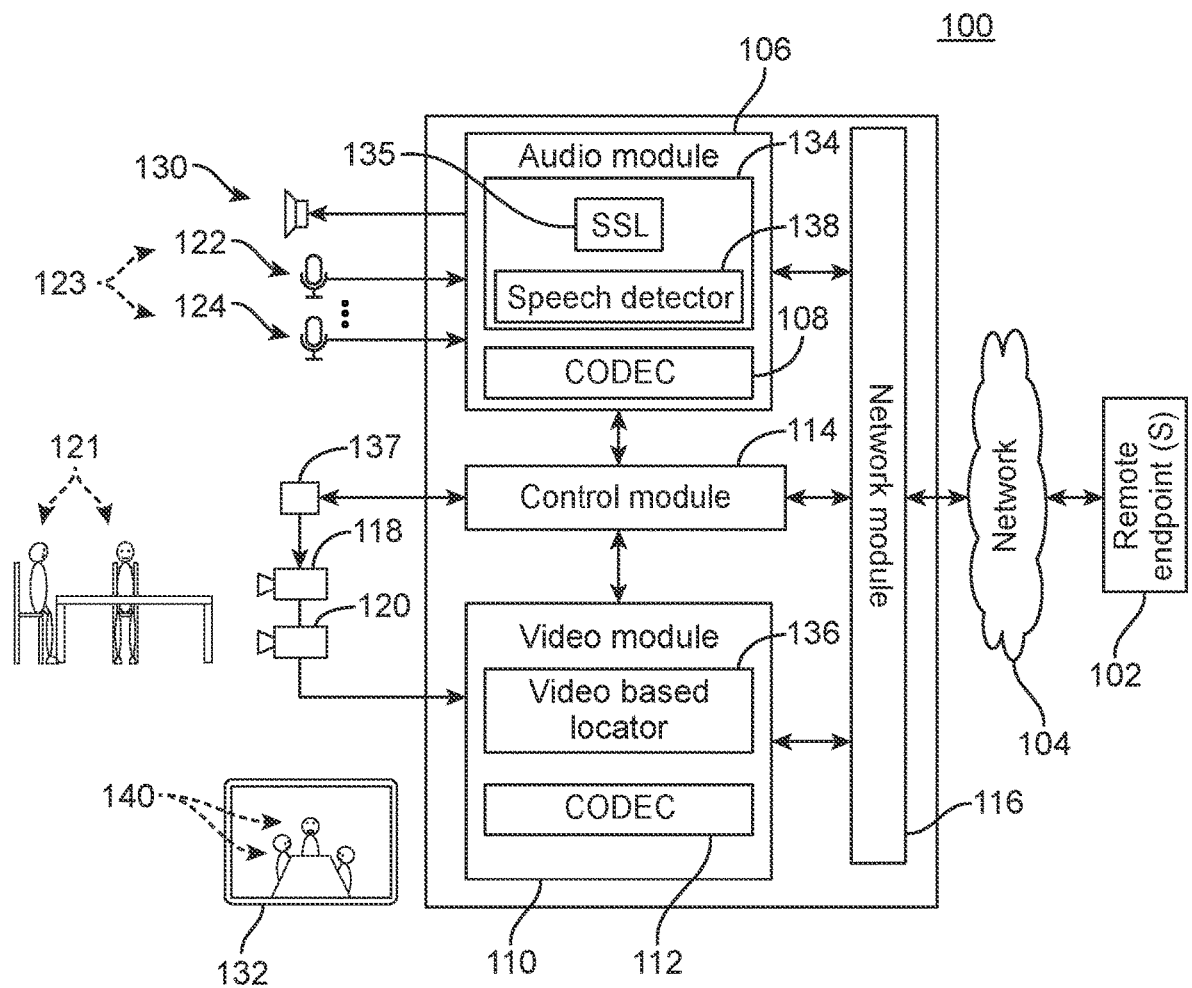
FIG. 1 illustrates a videoconferencing endpoint, in accordance with an example of this disclosure.

In the drawings and the description of the drawings herein, certain terminology is used for convenience only and is not to be taken as limiting the examples of the present disclosure. In the drawings and the description below, like numerals indicate like elements throughout.

In at least one example of this disclosure, a videoconferencing device can detect and focus on an active talker. One or more microphones can be used to determine the direction from the videoconferencing device to the active talker. One or more microphones can be used to determine the location of a subject (e.g., an active talker), relative the microphones and/or relative one or more cameras. In one or more examples of this disclosure, one or more cameras are used to locate the face of an active talker. Based on the direction and the location, a view of the active talker can be captured for transmission to another endpoint and the active talker can be tracked during a videoconference, in accordance with one or more examples.

In at least one method of this disclosure, multiple frames in a stream are individually scored. The individual scores of the frames can be normalized using standard statistical methods. Outlier scores of individual frames can be rejected. The scores of the individual frames are averaged to acquire a comprehensive score for a video stream. Based on the comprehensive score, a determination may be made as to which way a person's head is pointing or which way a person is facing. When a person is an active talker that person's face may be present in the camera feed of more than one camera. In at least one example of this disclosure, a preferred feed is selected because in the preferred feed the active talker's face is more closely oriented toward the camera that captured the preferred feed.

FIG. 1 illustrates a videoconferencing endpoint 100 in accordance with an example of this disclosure. The videoconferencing apparatus or endpoint 100 communicates with one or more remote endpoints 102 over a network 104. Components of the endpoint 100 include an audio module 106 with an audio codec 108 and a video module 110 with a video codec 112. Modules 106, 110 are operatively coupled to a control module 114 and a network module 116. In some examples, when a view subject is zoomed in upon by a camera, a sub-portion of the captured image containing the subject is rendered, whereas other portions of the image are not.

During a videoconference, two or more cameras (e.g., camera 118 and camera 120) capture video and provide the captured video to the video module 110 and codec 112 for processing. The optical center of a lens (326) of a camera is centered on a Z-axis (322) of that camera. In at least one example of this disclosure, both camera 118 and camera 120 are smart cameras. In at least one example of this disclosure, one camera (e.g., 118) is a smart camera and one camera (e.g., 120) is not a smart camera. In some examples, two or more cameras (e.g., camera 118 and camera 120) are cascaded such that one camera controls some or all operations of the other camera. In some examples, two or more cameras (e.g., camera 118 and camera 120) are cascaded such that data captured by one camera is used (e.g., by control module 114) to control some or all operations of the other camera. In accordance with one or more examples of this disclosure, one or more cameras (e.g., 118, 120) are releasably coupled to one or more processors (e.g., 206) at the endpoint 100. Additionally, one or more microphones (e.g., 122, 124) capture audio and provide the audio to the audio module 106 and codec 108 for processing. These microphones 122, 124 can be table or ceiling microphones, or they can be part of a microphone pod or the like. In one or more examples, the microphones 122, 124 are tightly coupled with one or more cameras (e.g., camera 118 and camera 120). The endpoint 100 may use the audio captured with these microphones 122, 124 for the conference audio.

In some examples, the microphones 122, 124 can reside within a microphone array (e.g., 123) that includes both vertically and horizontally arranged microphones for determining locations of audio sources, e.g., people who are speaking. In some examples, one or more microphones (e.g., 122, 124) can reside within one or more microphone arrays (e.g., 123) which are orthogonal with one another for determining locations of audio sources, e.g., people who are speaking. In some examples, the endpoint 100 uses audio from one or more microphones (e.g., 122, 124) for camera tracking purposes. In some examples, endpoint 100 uses audio from microphones 122, 124 for camera tracking and/or conference audio. In one or more examples, endpoint 100 uses audio from microphones 122, 124 to determine locations of conference participants.

After capturing audio and video, the endpoint 100 encodes the audio and video in accordance with an encoding standard, such as MPEG-1, MPEG-2, MPEG-4, H.261, H.263 and H.264. Then, the network module 116 outputs the encoded audio and video to the remote endpoints 102 via the network 104 using an appropriate protocol. Similarly, the network module 116 receives conference audio and video through the network 104 from the remote endpoints 102 and transmits the received audio and video to their respective codecs 108/112 for processing. Endpoint 100 also includes a loudspeaker 130 which outputs conference audio, and a display 132 which outputs conference video.

In at least one example of this disclosure, the endpoint 100 uses the two or more cameras 118, 120 in an automated and coordinated manner to handle video and views of a videoconference environment dynamically. In some examples, a first camera (e.g. 118) is a fixed or room-view camera, and a second camera 120 is a controlled or people-view camera. Using the room-view camera (e.g. 118), the endpoint 100 captures video of the room or at least a wide or zoomed-out view of the room that would typically include all the videoconference participants 121 as well as some of their surroundings.

According to some examples, the endpoint 100 uses the people-view camera (e.g., 120) to capture video of one or more participants, including one or more current talkers, in a tight or zoomed-in view. In at least one example, the people-view camera (e.g., 120) may pan, tilt and/or zoom.

In at least one arrangement, people-view camera (e.g., 120) is a steerable pan-tilt-zoom (PTZ) camera, while room-view camera (e.g., 118) is an electronic pan-tilt-zoom (EPTZ) camera. As such, the people-view camera (e.g., 120) can be steered, while the room-view camera (e.g., 118) cannot. In at least one example, both camera 118 and camera 120 are EPTZ cameras. In at least one example, camera 118 is associated with a sound source locator (e.g., 135) of an audio-based locator (e.g., 134), while camera 120 is not. In at least one example, camera 120 is associated with a sound source locator 135 and camera 118 is not. In some examples, both cameras 118, 120 can each be associated with a sound source locator 135.

In some examples, the endpoint 100 may alternate between tight views of a speaker and wide views of a room. In some examples, the endpoint 100 alternates between two different tight views of the same or different speaker. In some examples, the endpoint 100 will capture a first view of a person with one camera and a second view of the same person with another camera and determine which view is better for sharing with a remote endpoint 102.

In at least one example of this disclosure, the endpoint 100 outputs video from only one of the two cameras 118, 120 at any given time. As a videoconference proceeds, the output video from the endpoint 100 can switch from the view of one camera to another. In accordance with some examples, the endpoint 100 outputs a room-view when there is no participant speaking, and a people-view when one or more participants 121 are speaking.

In accordance with an example, the endpoint 100 can transmit video from both cameras 118, 120 simultaneously, and the endpoint 100 can let the remote endpoint 102 decide which view to display, or determine that one view will be displayed relative the other view in a specific manner. For example, one view can be composited as a picture-in-picture of the other view.

In one or more examples, the endpoint 100 may use audio-based locator 134 and a video-based locator 136 to determine locations of participants 121 and frame views of the environment and participants 121. The control module 114 may use audio and/or video information from these locators 134, 136 to crop one or more captured views, such that one or more subsections of a captured view will be displayed on a display 132 and/or transmitted to a remote endpoint 102. In some examples, commands to one or both cameras 118, 120 are implemented by an actuator or local control unit 137 having motors, servos, and the like to steer one or both cameras 118, 120 mechanically. In some examples, such camera commands can be implemented as electronic signals by one or both cameras 118, 120.

In some examples, to determine which camera's view to use and how to configure a view, the control module 114 uses audio information obtained from the audio-based locator 134 and/or video information obtained from the video-based locator 136. For example, the control module 114 may use audio information processed by the audio-based locator 134 from the microphones 122, 124. In some examples, the audio-based locator 134 uses a speech detector 138 to detect speech in audio captured by microphones 122, 124 to determine a location of a current participant. In some examples, the control module 114 uses video information captured using the cameras 118, 120 and processed by the video-based locator 136 to determine the locations of participants 121, to determine the framing for the views, and to control the one or more of the cameras (e.g., 118, 120). In other examples, none of the cameras is physically steerable.

A wide view from one camera (e.g., 118) can give context to a zoomed view from another camera (e.g., 120) so that participants 140 at the far-end 102 see video from one camera (e.g., 118) while the video from the other camera (e.g., 120) is being adjusted. In some examples, transitions between the two views from the cameras 118, 120 can be faded and blended to avoid sharp cut-a-ways when switching between camera views. In some examples, a switch from a first view to a second view for transmission to a remote endpoint 102 will not occur until an active participant 121 has been present in the second view for a minimum amount of time. In at least one example of this disclosure, the minimum amount of time is one second. In at least one example, the minimum amount of time is two seconds. In at least one example, the minimum amount of time is three seconds. In at least one example, the minimum amount of time is four seconds. In at least one example, the minimum amount of time is five seconds. In other examples, other minima (e.g., 0.5-7.0 seconds) are used, depending on such factors as the size of a conference room, the number of participants 121 at an endpoint 100, the cultural niceties of the participants 140 at the remote endpoint 102, and the sizes of one or more displays 132 displaying captured views.

Figure 2:
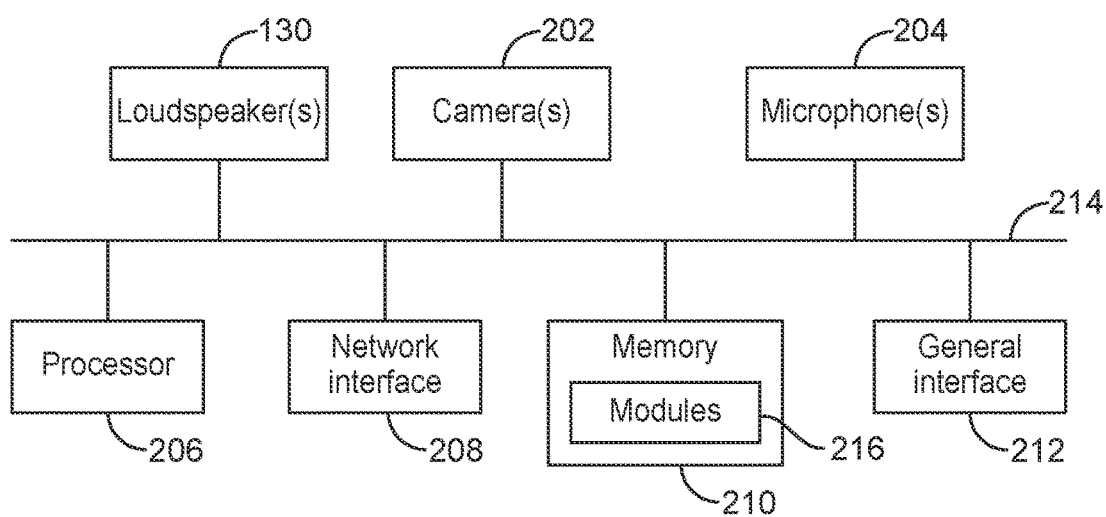
FIG. 2 illustrates aspects of the videoconferencing endpoint of FIG. 1.

FIG. 2 illustrates aspects of videoconferencing endpoint 200 (e.g., 100), in accordance with an example of this disclosure. The endpoint 200 includes a loudspeaker 130, camera(s) 202 (e.g., 118, 120) and microphone(s) 204 (e.g., 122, 124). The endpoint 200 also includes a processing unit 206, a network interface 208, a memory 210 and an input/output interface 212, all coupled by bus 214.

The memory 210 can be any conventional memory such as SDRAM and can store modules 216 in the form of software and firmware for controlling the endpoint 200. In addition to audio and video codecs (108, 112) and other modules discussed previously, the modules 216 can include operating systems, a graphical user interface that enables users to control the endpoint 200, and algorithms for processing audio/video signals and controlling the camera(s) 202. In at least one example of this disclosure, one or more of the cameras 202 can be a panoramic camera.

The network interface 208 enables communications between the endpoint 200 and remote endpoints (102). In one or more examples, the interface 212 provides data transmission with local devices such as a keyboard, mouse, printer, overhead projector, display, external loudspeakers, additional cameras, and microphone pods, etc.

The camera(s) 202 and the microphone(s) 204 capture video and audio, respectively, in the videoconference environment and produce video and audio signals transmitted through bus 214 to the processing unit 206. In at least one example of this disclosure, the processing unit 206 processes the video and audio using algorithms in the modules 216. For example, the endpoint 200 processes the audio captured by the microphone(s) 204 as well as the video captured by the camera(s) 202 to determine the location of participants 121 and control and select from the views of the camera(s) 202. Processed audio and video can be sent to remote devices coupled to network interface 208 and devices coupled to general interface 212.

Figure 3A:
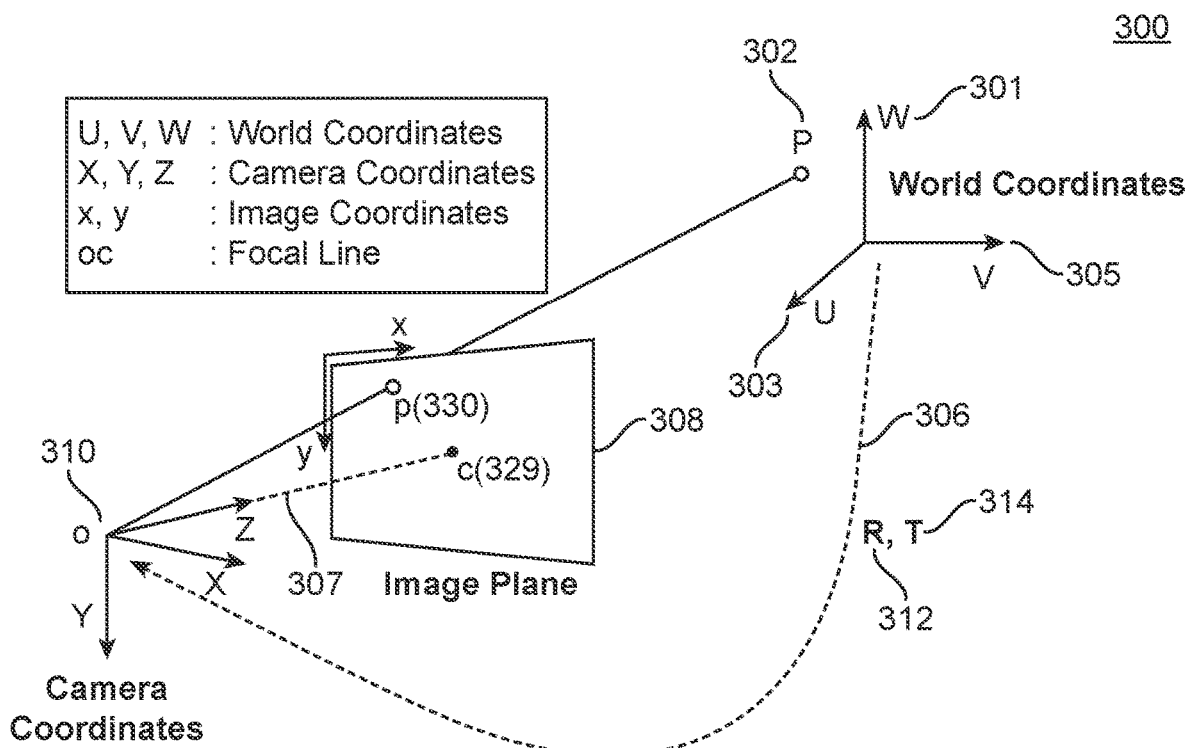
FIGS. 3A-B illustrate a method of evaluating the orientation of a conference attendee's face, in accordance with an example of this disclosure.
Figure 3B:
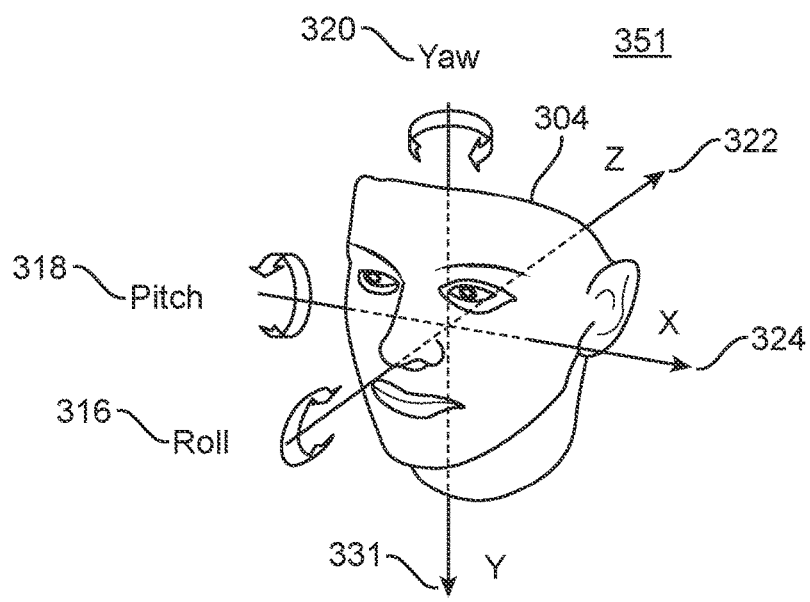

FIGS. 3A-B illustrate a method 300 of estimating head orientation 351 from images captured by a camera 202, in accordance with an example of this disclosure. To calculate the orientation 351 of a participant's head (and/or face) 304 in one or more images, the method 300 uses information such as facial landmarks, three-dimensional locations 302 of facial landmarks, and certain parameters of the camera 202 which captured the images. Facial landmarks can include the corners of the eyes, the tip of the nose, and/or corners of the mouth. For an excellent discussion of facial landmarking, see CN utility patent application no. 2019-10706647.9, filed Aug. 1, 2019 and entitled "Detecting Spoofing Talker in a Videoconference." Three-dimensional coordinates of the landmarks can be determined in accordance with a three-dimensional model, such as described in CN utility patent application no. 2019-10706647.9. Camera 202 has a lens (326) with a focal line 307, as shown in FIG. 3A. Camera 202 parameters used by the method 300 include the camera's focal length (327), the optical center 329 of an image captured by the camera 202, image radial distortion parameters associated with the camera's lens (326), and the camera's location 310 (e.g., the location of the centroid (352) of the camera's lens (326)).

For ease of explanation, reference is made to a ('real') world coordinate system having a V-axis 305, W-axis 301, and U-axis 303 (see FIG. 11), and a camera coordinate system having respective X-axis 324, Y-axis 331 and Z-axis 322, and whose origin lies at the location 310 of the lens (326) of the camera 202. Reference is also made to an image plane 308 having an x-axis and a y-axis and a center 329. The method 300 applies an appropriate algorithm such as a direct linear transform algorithm to determine 306 a rotation vector function (R) 312 corresponding to the participant's head 304 and a translation function (T) 314 to project three dimensional points 302—as virtual points 330—onto an image plane 308 corresponding to a display device 132 based, at least in part, on the intrinsic parameters (e.g., location 310) of the camera 202. A head/face orientation 351 corresponding to vector function (R) 312 can be represented as Euler angles roll 316 (rotated around the Z-axis 322), pitch 318 (rotated around the X-axis 324), and yaw 320 (rotated around the Y-axis 331) as illustrated in FIG. 3B.

Figure 3C:
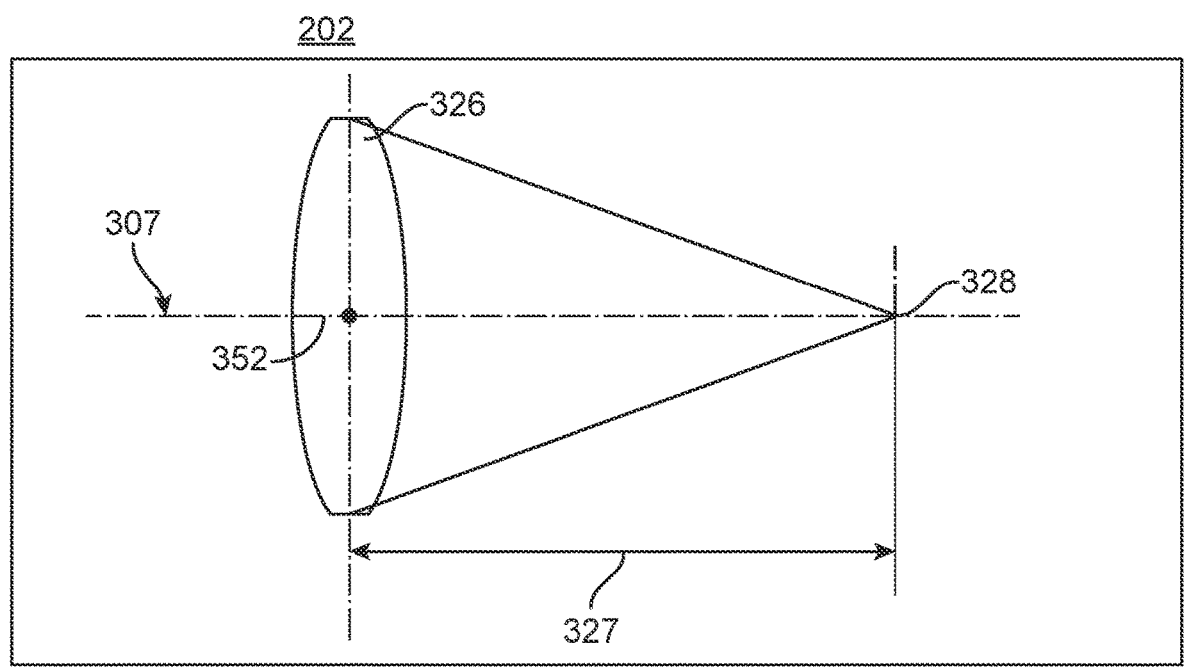
FIG. 3C illustrates aspects of a camera, in accordance with an example of this disclosure.

FIG. 3C illustrates aspects of a camera 202, in accordance with an example of this disclosure. The camera 202 has a lens 326, a central region or centroid 352, and a focal length 327 between the center 352 of the lens 326 and a focal point 328 of the lens 326. The focal length 327 lies along the lens's focal line 307 (see FIG. 3A).

Figure 4:
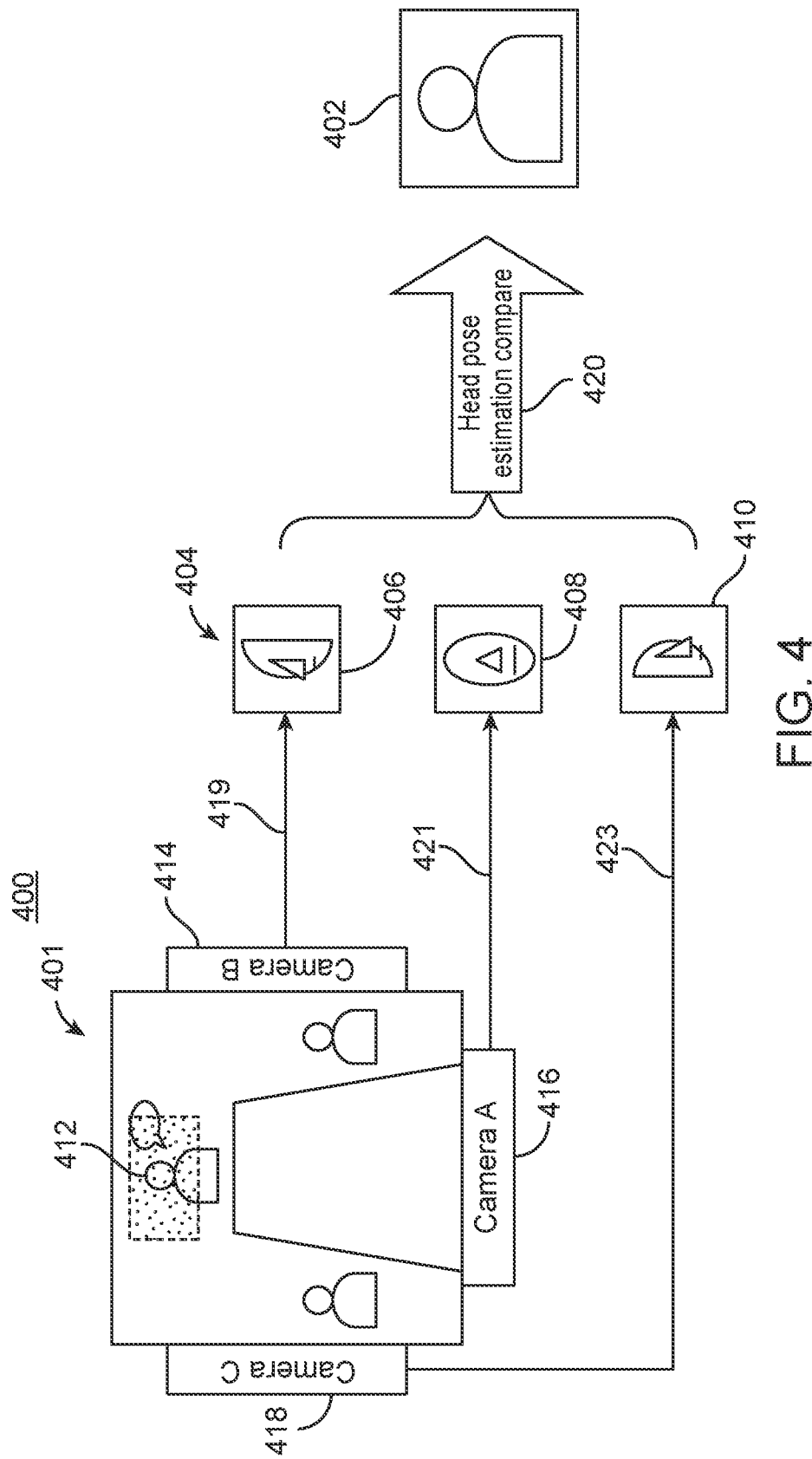
FIG. 4 illustrates a method of selecting a view based on an orientation of the conference attendee's face, in accordance with an example of this disclosure.

FIG. 4 illustrates a method 400 for selecting an optimal view 402 from among a plurality 404 of views (e.g., 406, 408, 410). A video-based locator 136 and a sound source locator module 135, are used to detect and zoom in on an active participant 412 at a teleconferencing endpoint 401 (e.g., 100, 200). (Though views directed towards an active talker are given as examples, the method 400 can be used to select from amongst views composed for other reasons.) A first camera 414 (e.g., 202) captures 419 a first view 406. A second camera 416 captures 421 a second view 408, and a third camera 418 captures 423 a third view 410. In accordance with method 400, an artificial neural network of one or more processors (e.g., 206) is used to estimate a head pose value such as roll 316, pitch 318, and/or yaw 320, as well as determine a degree of confidence in the estimated value. In some examples, the neural network comprises a convolutional neural network. In at least one example of this disclosure, the degree of confidence corresponds to a confidence score from zero to unity, (see 522 of FIG. 5). The pose values such as yaw 320 are—regardless of the accuracy and speed of the cameras 202 and processors 206, always estimates—because of the time required for light to travel from the active speaker 412 to the cameras 202. Such an estimate is also known as a 'prediction' in the relevant literature. In at least one example of this disclosure, each of the Euler angles is considered when determining which view of a person to render or share. In at least one example of this disclosure, two of the three Euler angles are considered when determining which view of a person to render or share. In at least one example of this disclosure, one of the three Euler angles considered when determining which view of a person to render or share. In an example of this disclosure, each of the cameras 202 is placed at the same height along the Y-axis 331 and the W-axis 301, (see FIGS. 3A-B). In some examples of this disclosure, when the centers of the lenses (326) of the cameras are at (substantially) the same height, consideration of yaw can be sufficient to make a proper view selection, such as when the distance from a camera to a participant does not exceed some multiple of the lens's focal length. According to the method 400, multiple views of a subject are captured with multiple cameras. The yaw of the person's head with respect to the camera that captured the view will vary from camera to camera. As illustrated in FIG. 3B, a positive yaw value 320 means the subject's is turned to the right (clockwise) about the Y-axis 331, and negative yaw value 320 means the subject's head is turned to the left (counterclockwise) about the Y-axis. The view corresponding to the lowest absolute yaw value corresponds to the view in which the speaker 412 is more directly looking into the camera. In one or more examples of this disclosure, the view containing the lowest absolute yaw value will be selected for transmission to a remote endpoint for display. Thus, according to method 400, the yaw values for the views are compared 420 and the view 402 corresponding to the lowest absolute yaw value is selected for rendering. The orientation corresponding to the lower yaw value is more closely aligned with the focal line 307 of the camera 202 which captured the view corresponding to the orientation than the focal line 307 of another camera 202. In some examples, the view 402 having the lowest yaw value will be selected for rendering, provided the view (corresponding to a series of images captured with camera) has been the view with the lowest yaw for a threshold amount of time to avoid switching views too quickly, which can be unpleasant for viewers. In a similar vein, in some examples the view 402 having the lowest yaw value will be selected for rendering, provided the difference between the yaw values is greater than a second (difference) threshold. At least one technical benefit of examples of this disclosure is that such examples provide a teleconferencing experience having a greater degree of similitude than would otherwise be the case.

Figure 5:
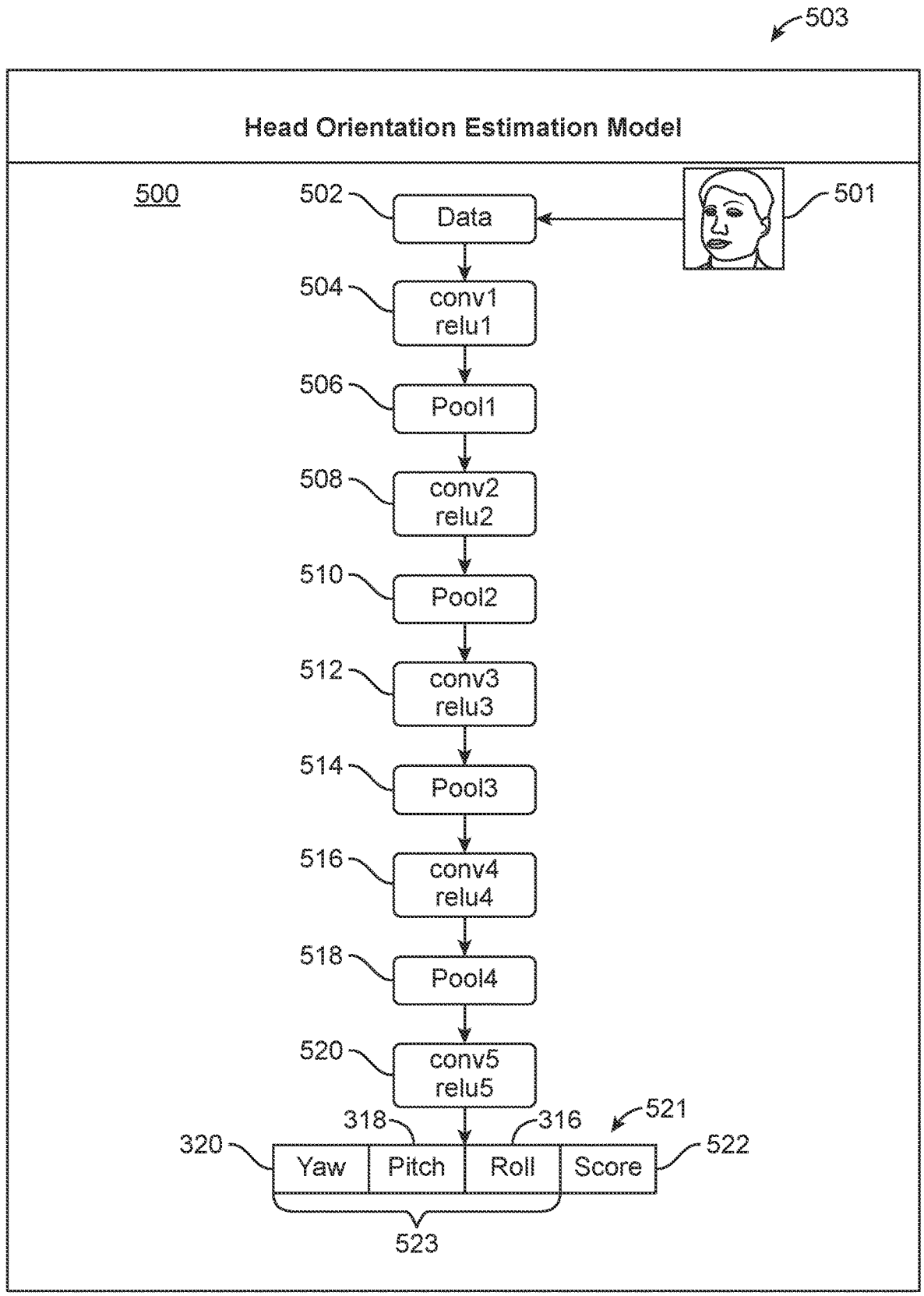
FIG. 5 illustrates a head orientation estimation method, in accordance with the method of FIG. 4.

FIG. 5 illustrates a head orientation estimation method 500, in accordance with examples of this disclosure. Head orientation estimation method 500 can be implemented in accordance with a head orientation estimation model 503. As described with respect to FIG. 4, a frame 501 of a view (e.g., 406, 408, 410) is captured by a camera 202 (e.g., 414, 416, 418). The image data 502 corresponding to captured frame(s) 501 passes to a first convolutional layer 504 and a first rectified linear activation function is applied. The rectified output of the first convolutional layer 504 then passes to a first pooling layer 506. The output of the first pooling layer 506 then passes to a second convolutional layer 508 and a second rectified linear activation function is applied. The rectified output of the second convolutional layer 508 then passes to a second pooling layer 510. The output of the second pooling layer 510 then passes to a third convolutional layer 512 and a third rectified linear activation function is applied. The rectified output of the third convolutional layer 512 then passes to a third pooling layer 514.

The output of the third pooling layer 514 then passes to a fourth convolutional layer 516 and a fourth rectified linear activation function is applied. The rectified output of the fourth convolutional layer 516 then passes to a fourth pooling layer 518. The output of the fourth pooling layer 518 then passes to a fifth convolutional layer 520 and a fifth rectified linear activation function is applied. The rectified output 521 of the fifth convolutional layer 520 contains estimates of the orientation of the head (face) in the view 501. The orientation estimate 523 can include an estimate of yaw 320, an estimate of pitch 318, and an estimate of roll 316. The rectified output 521 of the fifth convolutional layer 520 also contains a confidence score 522 (e.g., from 0 to 1) of the orientation estimate 523. In at least one example, if the confidence score 522 for an estimated orientation value does not exceed 0.95 (ninety-five percent), the view 501 corresponding to the image data 502 will not be used to determine which view from among views of different cameras will be selected for further rendering. That is, the fact that a confidence score 522 falls below the threshold does not necessarily mean that a currently rendered view will be deselected, but rather that the orientation (result) estimate 523 associated with captured frame(s) 501 will not cause a change in selection. For example, a current frame of a captured feed which is currently not being rendered (e.g., being transmitted to a remote endpoint) will not be selected based on the estimate of the orientation of the face of the person in that feed unless there is at least a 95% certainty that that estimate is correct, even if the certainty of the estimate for the orientation corresponding to the currently rendered feed is lower, regardless of which orientation (e.g., associated yaw value 320) is considered preferable. However, in some examples of this disclosure, another layer of scrutiny may be applied to an image depicting a subject whose face has been determined to have a suitable orientation (e.g., lowest/lower yaw value 320) with sufficient certainty (e.g., confidence in the determined yaw value is greater than 95%), as discussed below with reference to FIG. 6 below.

Figure 6:
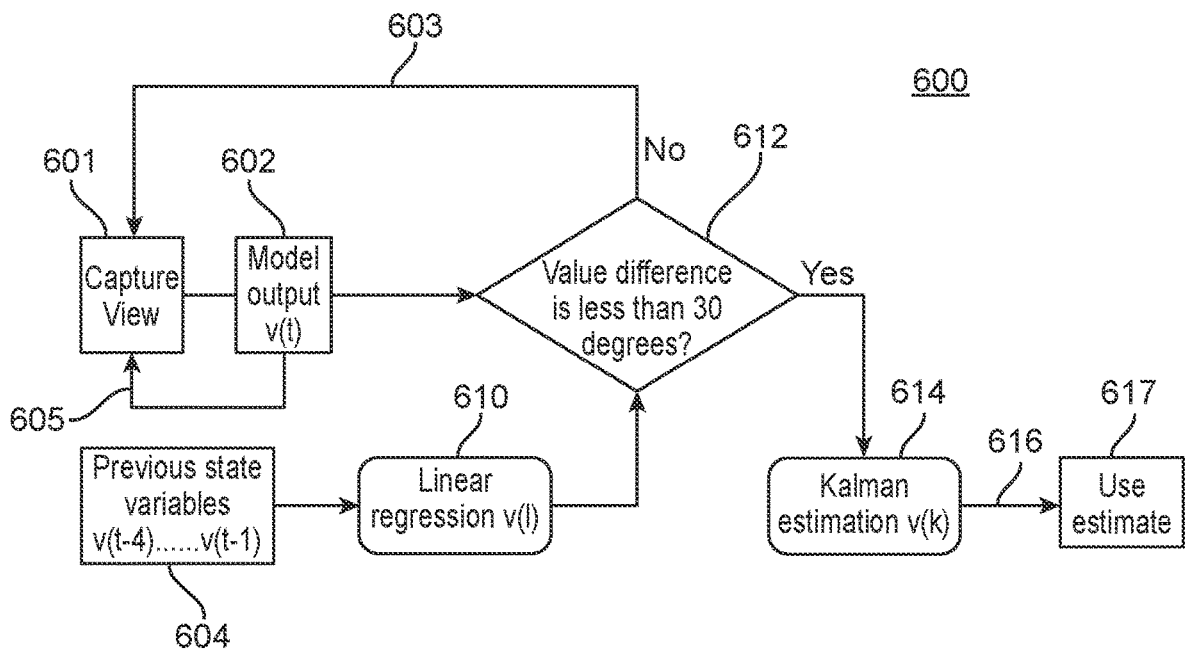
FIG. 6 illustrates an enhancement process for the method of FIG. 4.

FIG. 6 illustrates a method 600 which can be used to enhance a view selection process (e.g., method 400). As discussed, a feed captured by a camera comprises a series of frames (e.g., 501). Method 600 involves capturing 601 views/frames on an ongoing basis. A captured frame can be evaluated using the head orientation estimation method 500 of FIG. 5. A current state variable v(t) 602 corresponds to a current estimate of orientation 523. If the estimate (of orientation) 523 for a current frame is sufficiently reliable (at time t), then that (current) estimated orientation (and current state variable v(t) 602) from the estimation method 500 will be compared 612 to value v(l) (which relates to earlier orientation estimates). If the current state variable v(t) 602 is insufficiently reliable because, for example, the current state variable v(t) 602 is associated with a confidence score 522 which falls below a threshold, the current value of v(t) 602 will be ignored 605 and the next captured view (of 601) will be evaluated. Function v(l) corresponds to an orientation predicted by a linear regression analysis 610 of earlier state values (e.g., v(t−1), v(t−2), v(t−3), v(t−4) . . . v(t−n)) 604 related to previous head orientation estimates from method 500. (See description of FIG. 4 for discussion of 'predictions' and 'estimates.') In some examples of this disclosure, the amount of time (Δt) between each estimate is the same over a relevant range. In some examples of this disclosure, the amount of time (Δt) between each estimate is not the same over a similar range. If a current orientation estimate v(t) 602 from the method 500 is sufficiently close to the value v(l) expected from the linear regression analysis 610 (e.g., the difference between the two values less than 30 degrees; see 612), then v(t) 602 will be included in calculating a Kalman estimate v(k) by a Kalman filter 614 to produce ('final') orientation result 616. Kalman filter 614 works by averaging a current value (at time t=0), e.g., v(t) 602, with earlier values (at t−n) to predict the next t=0 value. Once Kalman filter 614 produces orientation result 616, result 616 will become state variable v(t−1), and the next captured frame (see 601) will be processed according to the method 600. The orientation result 616 corresponding to the current view (e.g., 501) from a camera will be used 617 in view selection. The orientation result 616 may be compared 420 to an orientation (result) value of one or more other cameras and be used 617 for view selection 400 as already described. If, on the other hand, the difference between the current orientation estimate v(t) 602 (from the method 500) and value v(l) is too great 603 (see 612) then the current output 602 from the orientation estimate method 500 will not be used in calculating v(k) by Kalman filter 614, the current value of v(l) (of 610) will become v(t−1), and the next captured view (see 601) will be evaluated. If v(t) 602 is not applied by the Kalman filter 614, the current value of v(k) is not changed. In either case, the most current value of v(k) is taken to be the estimated orientation 616 which is used 617 in view selection as previously described (see FIG. 4 and FIG. 5). In some examples, if the difference between the current orientation estimate v(t) 602 from the method 500 and value v(l) is too great, then the current orientation estimate v(t) 602 will not be applied by the Kalman filter 614, (that is v(t) 602 will not be averaged with v(l) by the Kalman filter 614), and the earlier state values 604 will not be changed. Regardless of whether the earlier state values 604 are revised, if the current estimate 602 from the method 500 is not sufficiently reliable because the current estimate 602 has a confidence score 522 which is too low or because the current estimate 602 varies too much from recent state values 604 (see 612), the current estimate 602 will not affect view selection 400.

Figure 7:
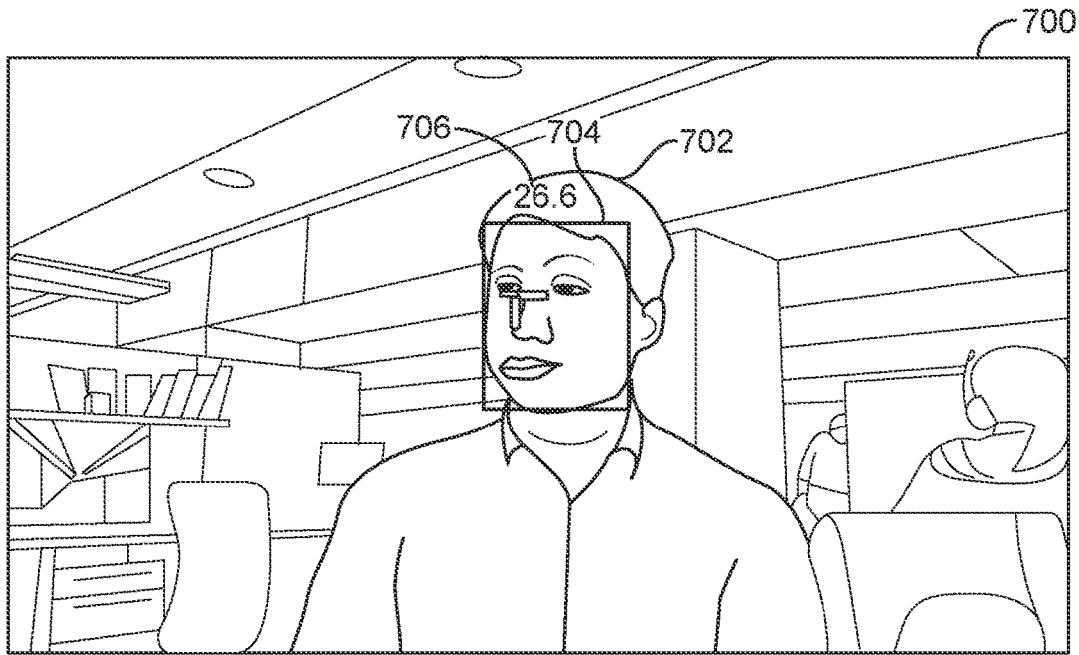
FIG. 7 illustrates a view containing a subject, in accordance with an example of this disclosure.

FIG. 7 illustrates a view 700 containing a subject 702. In at least one example of this disclosure, the region 704 of the view 700 containing the subject's face (e.g., 304) corresponds to a rendering of image data 502. The yaw 706 (e.g., 320) of the subject's head is estimated, in accordance with method 400 and/or method 500, to be 26.6 degrees, as shown.

Figure 8:
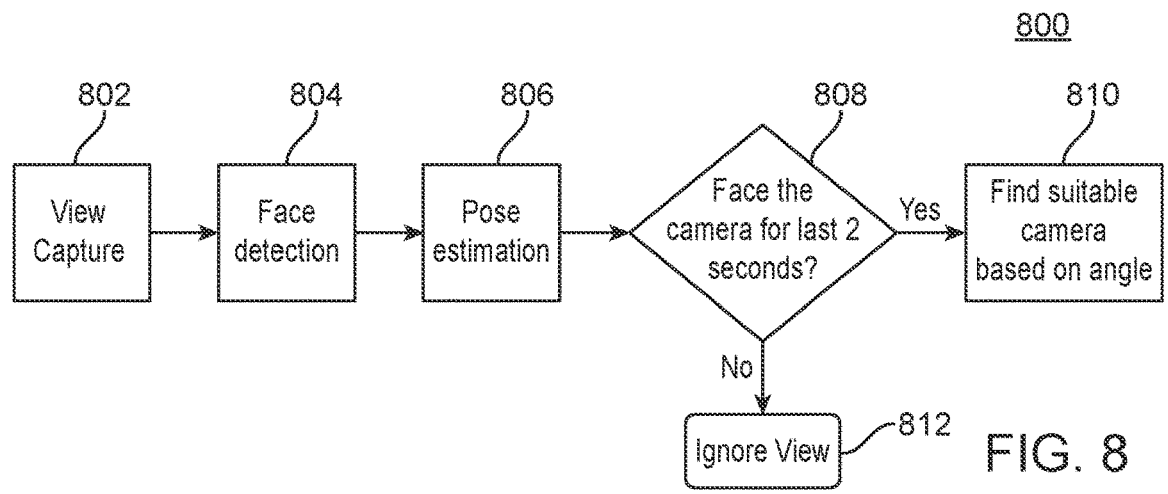
FIG. 8 illustrates a camera view switching method, in accordance with an example of this disclosure.

FIG. 8 illustrates a method 800 of determining whether to switch from a first view of a first camera to a second view of a second camera. A camera captures 802 a view, and a face is detected 804 within the view. The orientation of the face is determined 806 in accordance with method 400 and/or method 500. A determination 808 is then made as to whether the face has had substantially the same orientation for a minimum amount of time. If the face has had substantially the same orientation for a sufficiently long time (e.g., two seconds), the view corresponding to that substantially same orientation will be evaluated 810 as described (see FIG. 4 and FIG. 5), otherwise the view will be ignored 812 insofar as the view will not be compared to those of the other cameras. It is worth noting that this description holds true regardless of whether the view captured 802 by the first camera is currently the view being rendered on a display or transmitted to a remote endpoint due to an earlier selection of the view. In one or more examples of this disclosure, the orientations of more than one person at a time can be used to select from two or more views.

Figure 9A:
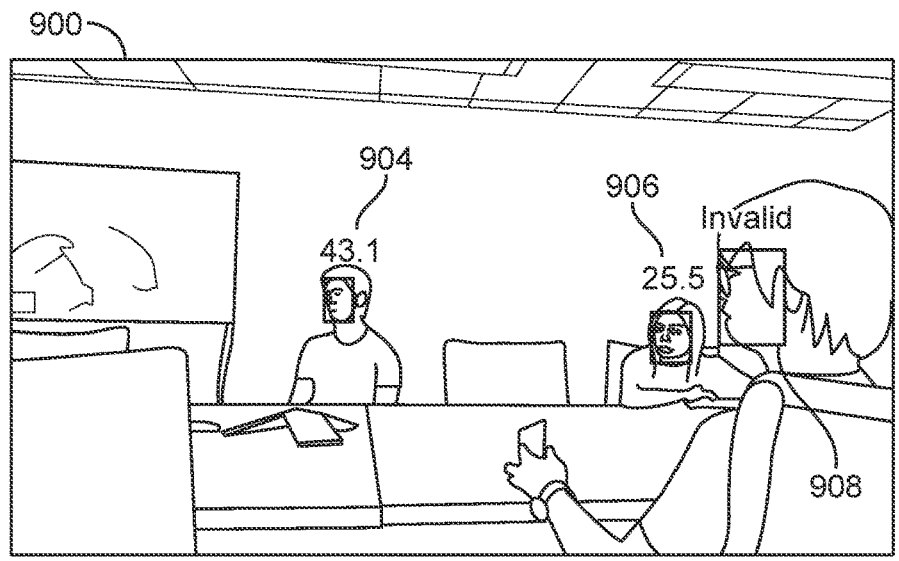
FIG. 9A illustrates a first view from a first camera containing three people, in accordance with an example of this disclosure.

FIG. 9A illustrates a first view 900 from a first camera containing three people. The yaw values 904, 906 (e.g., 320) for two people have been determined in accordance with one or more methods of this disclosure, but a yaw value 908 for the person on the right cannot be determined with enough confidence, (e.g., the confidence score 522 for the orientation estimate 523 is too low).

Figure 9B:
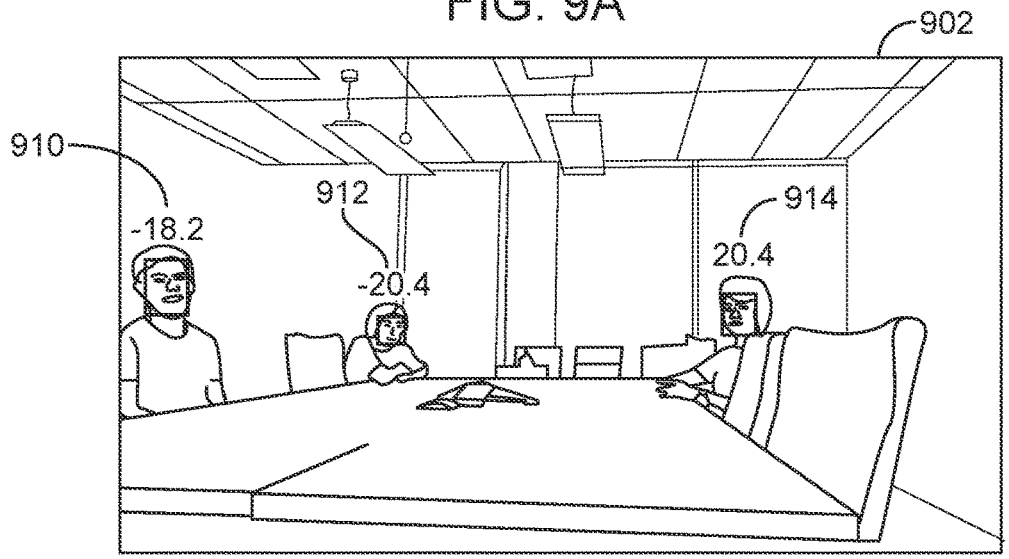
FIG. 9B illustrates a second view from a second camera containing the same three people of FIG. 9A.

FIG. 9B illustrates a second view 902 from a second camera. The second view 902 contains the same three people. The yaw values 910, 912, 914 for the three people have been determined in accordance with one or more methods of this disclosure. To determine which view is more suitable, the absolute values for the yaw values of each view 900, 902 are separately averaged and the averages compared. (For the first view, the yaw value of the third person may be treated as though it is 90 degrees, since a good estimate is not available.) The overall score calculated for the first view 900 is 52.9 degrees ([abs(43.1)+abs(25.5)+abs(90)]/3). For the second view 902, the overall score calculated is 19.7 degrees ([abs(−18.2)+abs(−20.4)+abs(20.4)]/3). The average absolute yaw value (19.7 degrees) for the second view 902 is lower than that (52.9 degrees) of the first view 900. Thus, in accordance with this example, the second view 902 will be selected for rendering.

Figure 10:
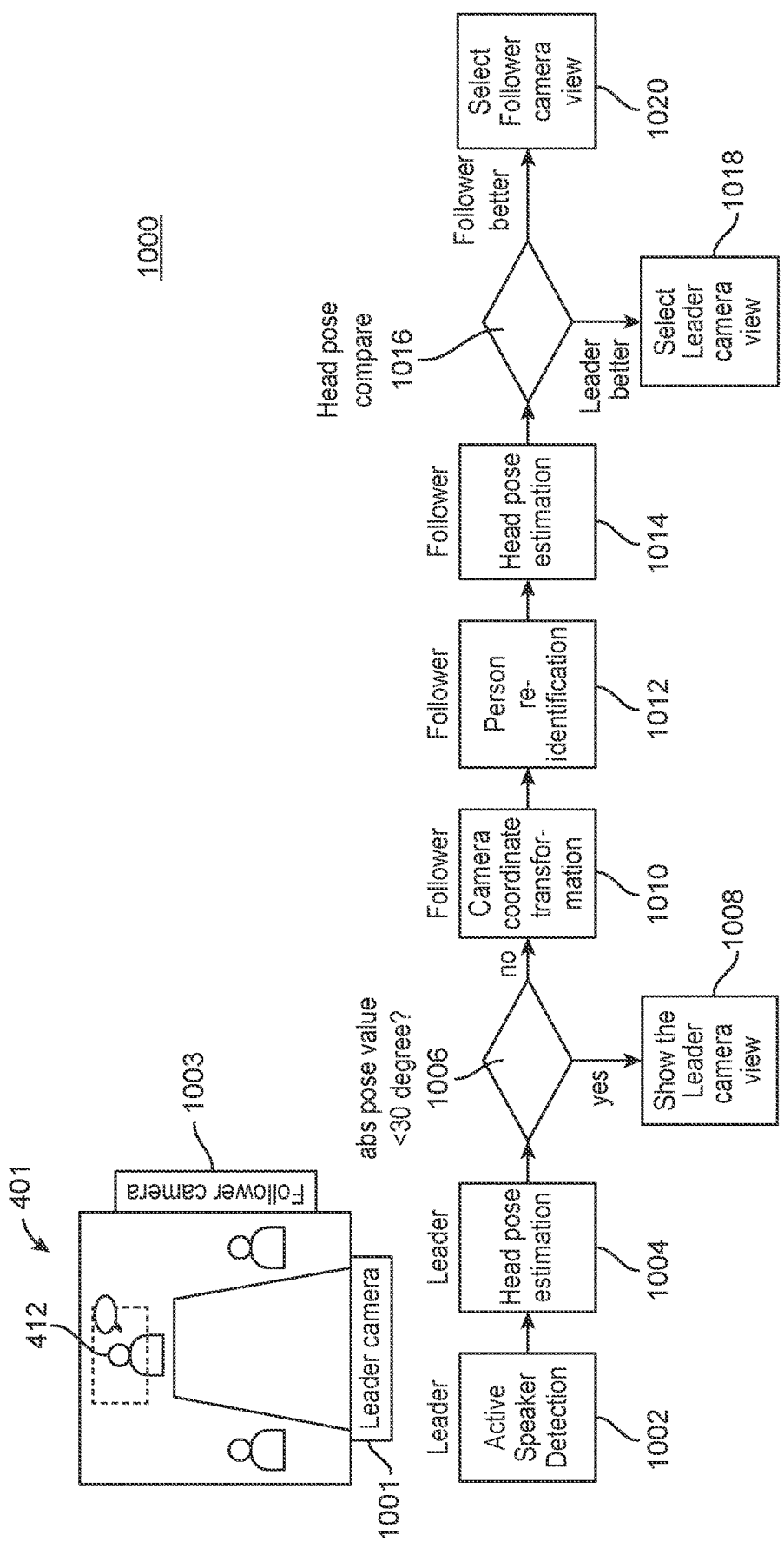
FIG. 10 illustrates a method of selecting from among views of different cameras, in accordance with an example of this disclosure.

FIG. 10 illustrates a method 1000 of selecting between views of different cameras. In method 1000 data from a first ('leader') camera 1001 at endpoint 401 is used to guide selection of the active talker 412 in the view captured by the second ('follower') camera 1003. In at least one example of this disclosure, the leader camera 1001 has access to a speech detector 138 and an sound source locator module 135 which the leader camera 1001 uses to detect an active talker 412 and select (frame) an active talker view, but the follower camera 1003 does not have such access. Therefore, in some examples of this disclosure, an active talker 412 cannot be detected in the view captured by the follower camera 1003 unless the image data captured by the follower camera 1003 is supplemented with data gathered by and/or for the leader camera 1001, as explained in greater detail with respect to FIG. 11.

In accordance with the method 1000 of FIG. 10, the leader camera 1001 captures a view and detects 1002 the presence of an active talker 412 in the view. The orientation of the active talker's face is evaluated 1004 in accordance with one or methods described. The active talker's gaze/facial orientation is evaluated 1006. If the active talker's gaze is sufficiently centered in the view from the leader camera 1001, the view from the leader camera 1001 will be further rendered 1008. In at least one example of this disclosure, determining if the active talker's gaze is sufficiently centered in the view comprises determining whether the absolute value of the yaw of the active talker's head is less than thirty degrees with respect to the leader camera's focal line 307 (see FIGS. 3A-C). If the orientation value in question exceeds the threshold (e.g., is greater than or equal to thirty degrees), the position of the speaker 412 relative the leader camera 1001 will be used to select 1010 an active talker view for the follower camera 1003. In at least one example, selecting 1010 an active talker view from within the feed being captured by the follower camera involves transforming (see FIG. 11) the coordinates of the active speaker 412 relative the leader camera 1001 into coordinates relative the follower camera 1003. Thereafter, the image data within a predetermined field of view relative the translated coordinates (such as described by a predetermined number of pixels or a predetermined angle in the Z-X, U-V planes; see FIGS. 3A-B) will be evaluated 1012 to confirm that the person in the portion (subsection) of the view from the follower camera is the same person who is the active talker 412 in the view from the leader camera 1001. Once it is determined that the active talker 412 of the first view and the person of the second view are the same person, the orientation (e.g., yaw 320) of that person's face with respect to the focal line (1120) of the follower camera 1003 will be determined 1014 (see methods 400, 500). The orientation corresponding to the leader camera 1001 and the orientation corresponding to follower camera 1003 are then compared 1016. All else being equal, if the orientation score (e.g., absolute value of estimated yaw 320) for the leader camera's view is lower, the view from the leader camera 1001 will be selected 1018 (e.g., for transmission to a remote endpoint). All else being equal, if the orientation score of the follower camera's view is lower (e.g., absolute value of estimated yaw 320), the view from the follower camera 1003 will be selected 1020 (e.g., for transmission to a remote endpoint).

Based on the size and position of the faces or heads captured by the leader camera 1001, the method 1000 can estimate the distance and angle of the active speaker (e.g., 1006) relative the leader camera 1001. Thereafter, an approximation of the angle and position of the active speaker relative the follower camera 1003 is made in accordance with the transformation between the coordinate systems of the two cameras. In accordance with examples of this disclosure, the position of the active speaker 412 relative the lens of the leader camera 1001 is used to make a preliminarily approximation of the angle and position of the active speaker 412 relative the follower camera 1003 by translating a coordinate system of the leader camera 1001 into a coordinate system of the follower camera 1003.

Figure 11:
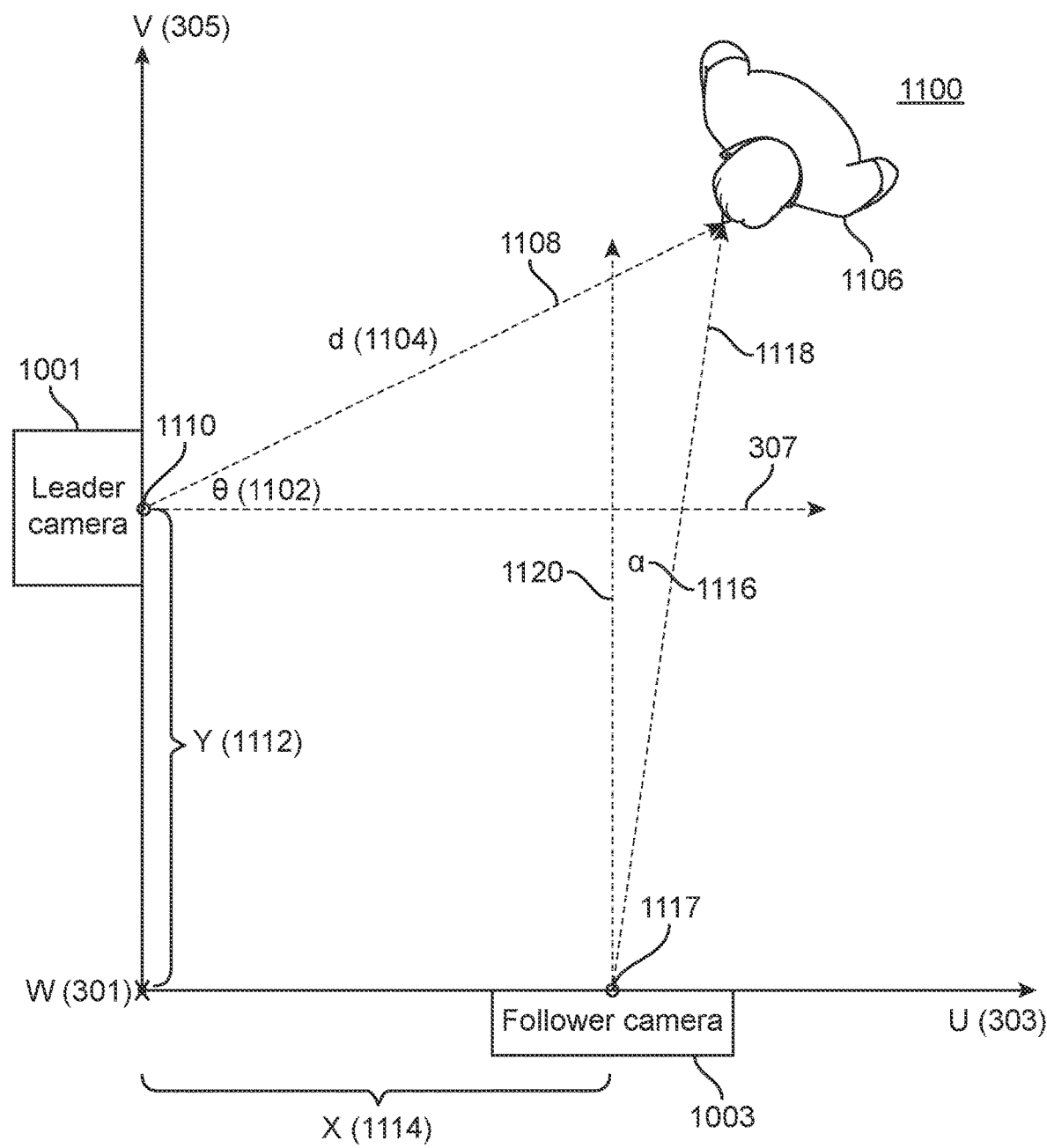
FIG. 11 illustrates a method of transforming values in a coordinate system of a leader camera into values for a coordinate system of a follower camera, in accordance with an example of this disclosure.

FIG. 11 illustrates a method 1100 of transforming values in a coordinate system of a leader camera 1001 into values for a coordinate system of a follower camera 1003. With respect to the leader camera, the person 1106 determined to be an active talker is distance d 1104 from the leader camera's lens 1110 (e.g., 326). In at least one example, the distance 1104 to the active talker is based on the face size of the active talker and/or the head size of the active talker in the video image(s) captured by the lead camera. Angle theta 1102 is the angle between the line 1108 along which the distance 1104 is measured and the focal line 307 of the leader camera 1001. As noted, distance 1104 and the direction of line 1108 are estimated based on such factors as the face size of the active talker and/or the head size of the active talker in the video image(s) captured by the lead camera. Angle theta 1102 is thus also based on such factors. The coordinates of the person 1106 with respect to the lens 1110 of the leader camera are dx(cosine of theta) in the U (303) direction and dx(sine of theta) in the V (305) direction taking the position of the lens 1110 of the leader camera as the origin. The W-axis 301 comes out of the page. The vertical height of the person 1106 lies along the W (301) direction, (see FIG. 3A). In the world (U-V) coordinate system, the coordinates of the leader camera are (0, y), where y 1112 is the distance of the leader camera's lens 1110 from the origin centered on the W-axis 301. In the world (U-V) coordinate system, the coordinates of the follower camera are (x, 0), where x 1114 is the distance of the follower camera's lens 1117 from the origin centered on the W-axis 301. The coordinates (U,V) of the person 1106 in the world coordinate system are U=dx(cosine of theta) and V=dx(sine of theta)+y). The position of the person 1106, taking the position of the follower camera as the origin, can be expressed as U=dx (cosine of theta)−x in the U direction (303), and V=dx(sine of theta)+y in the V direction (305). The angle α 1116 between the line 1118 marking the radial distance from the (lens 1117 of) follower camera 1003 and the focal line 1120 of the follower camera 1003 is therefore the arctangent of [(dx(cosine of theta)−x)/(dx(sine of theta)+y)]. The angle α 1116 and radial distance along line 1118 of the person 1106 with respect to the follower camera 1003 are thus a function of angle theta 1102, radial distance 1104, and the (location) coordinates of the person 1106 with respect to the leader camera 1001.

Figure 12A:
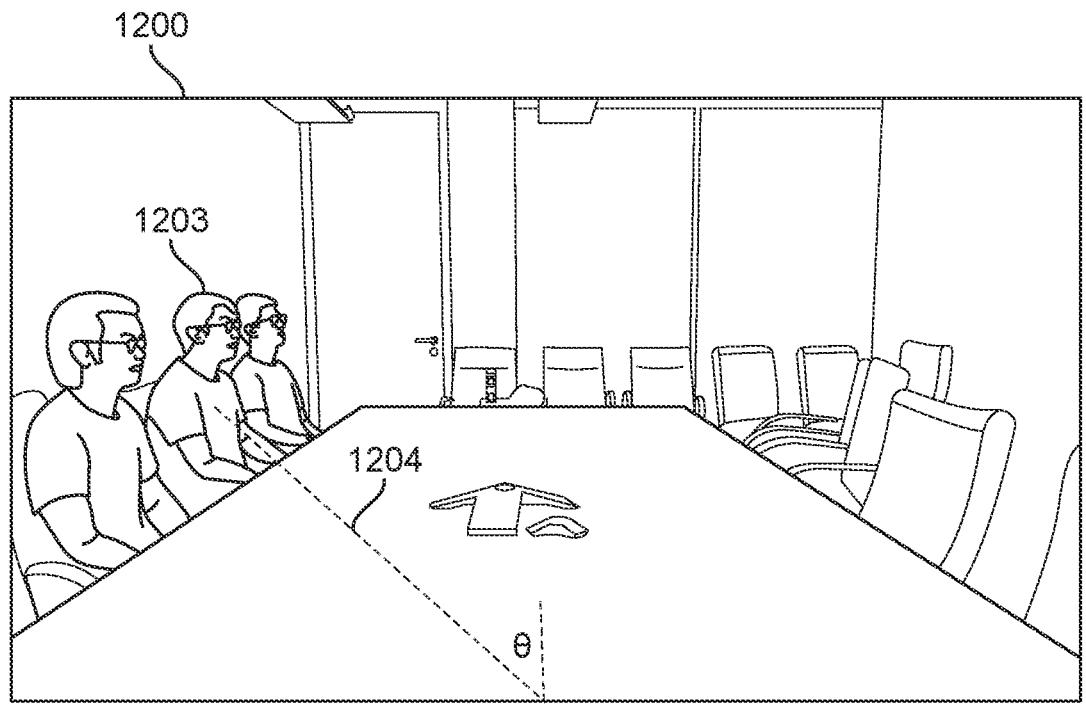
FIGS. 12A-B illustrate a method of guiding selection of an active talker in a follower camera view based on a determined position of an active talker of a leader camera view, in accordance with an example of this disclosure.
Figure 12B:
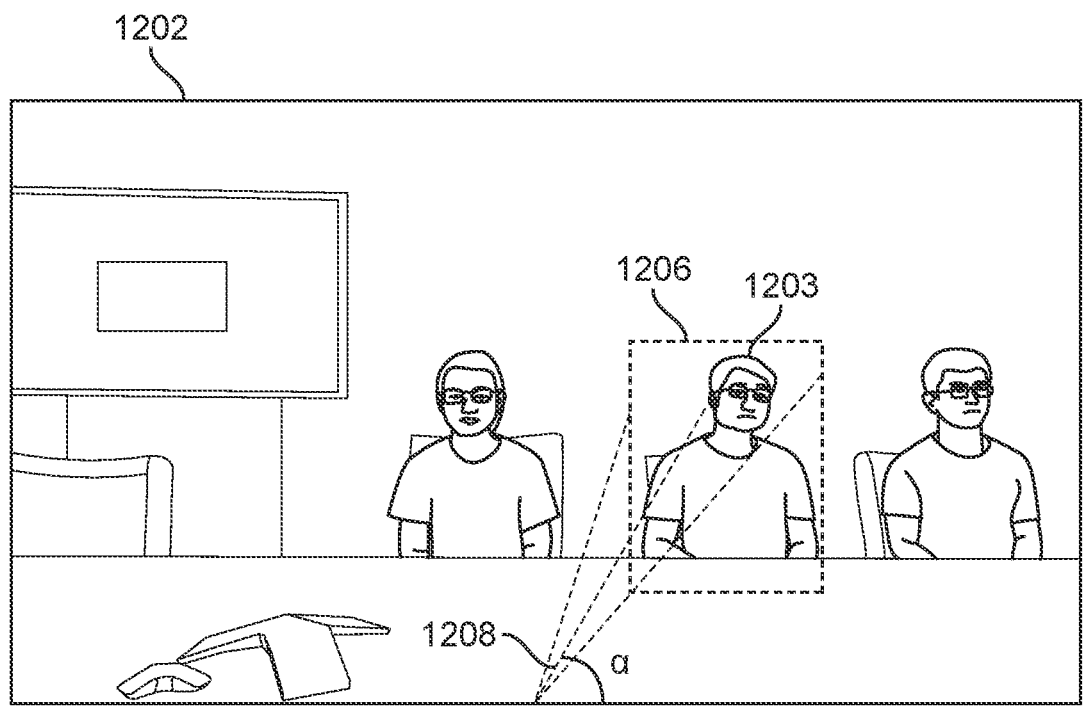

FIGS. 12A-B illustrate a method of guiding selection of an active talker in a follower camera view 1202 based on the determined position of the active talker 1203 of a leader camera view 1200. There are three people sitting in a row in the view 1200 of the leader camera, (e.g., 1001). The person 1203 in the middle has been determined to be the subject of focus (e.g., because he is currently talking). The active talker 1203 is at a radial distance along line 1204 at angle theta with respect to the focal line of the leader camera (e.g., 1001). The position of the active talker 1203 relative the leader camera is used to estimate the position of the active talker (e.g., angle α in FIG. 12B) with respect to the follower camera as described above, (see FIG. 11). FIG. 12B shows a view 1202 captured by a follower camera (e.g., 1003). A portion (subsection) 1206 of the view 1202 captured by the follower camera is selected based on the data from the leader camera. Using the transformation method 1100 set forth in FIG. 11, the radial distance (along line 1208) of the active talker from the (lens of) follower camera is estimated. The left and right boundaries of the selected portion 1206 correspond to predetermined values (+α and −α) for the angles centered along the line 1208 marking the radial distance to the active talker 1203 at angle α. In at least one example of this disclosure, a variation of plus and minus five degrees from α is selected.

Figure 13:
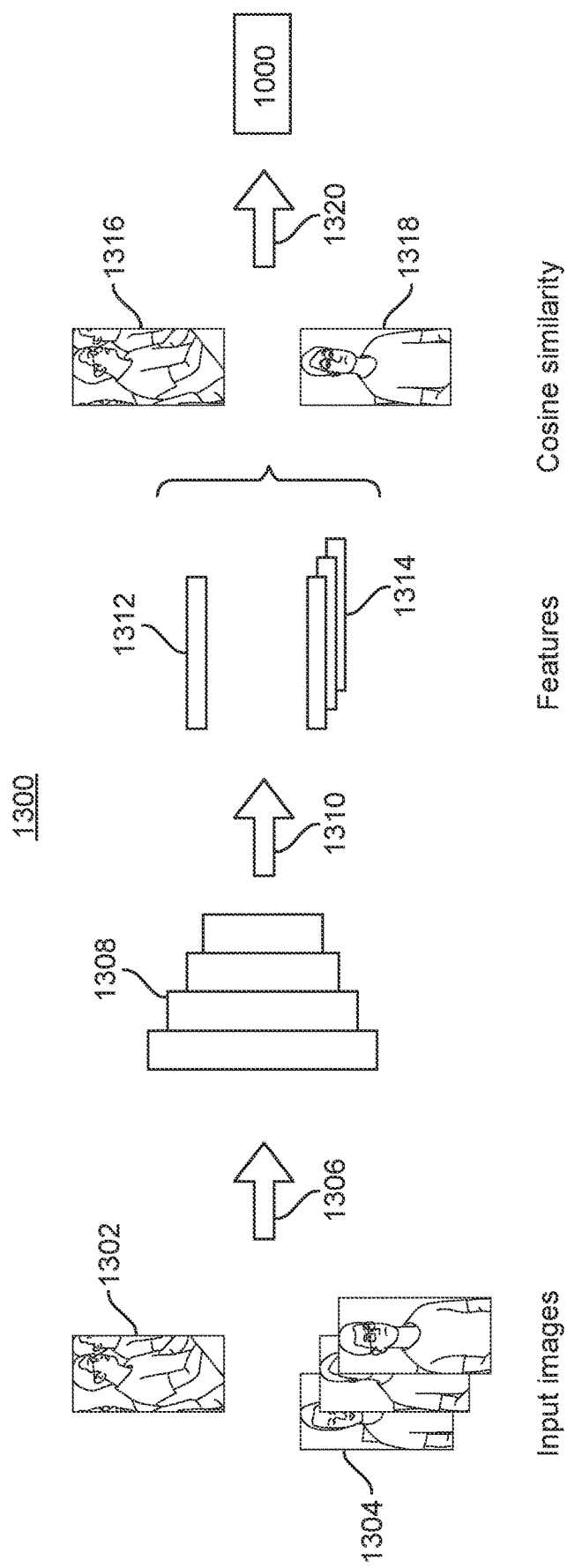
FIG. 13 illustrates a method of confirming that a portion of a follower camera view has been correctly selected, in accordance with an example of this disclosure.

FIG. 13 illustrates a method 1300 of confirming that the portion 1206 of the follower camera view 1202 which has been determined to depict the active talker of the leader camera was correctly selected. Images 1302 of the active talker from the leader camera and images 1304 captured by the follower camera (as guided according to method of FIGS. 12A-B) are extracted 1306 and analyzed 1308 using an artificial neural network of a processor (e.g., 206) or other suitable method producing 1310 features information relating to the views. The features 1312 of the person in the leader camera view and the features 1314 in images (of one or more people) from the follower camera are compared, and if the features of the person of portion 1206 are sufficiently similar to those of the active talker view 1316 from the leader camera, then portion 1206 will be taken to be a valid active talker view 1318, as depicting the same person found to be the active talker by the leader camera, (invalid talker views are ignored for purposes of method 1300). Thereafter, the active talker views 1316, 1318 from the cameras will be output 1320 and analyzed according to method 1000, and the view which best depicts the active talker will be selected for transmission or some other type of rendering. For example, the view 1202 captured by the follower camera of FIG. 12B would be selected over the view 1200 of the leader camera of FIG. 12A.

In at least one example of this disclosure, the features of the active talker in the leader camera view 1316 and the features of the active talker in the follower camera view 1318 are compared every two seconds, and if the features are not sufficiently similar, the position of the active talker with respect to the follower camera will be reevaluated as discussed with respect to FIG. 11.

Figure 14:
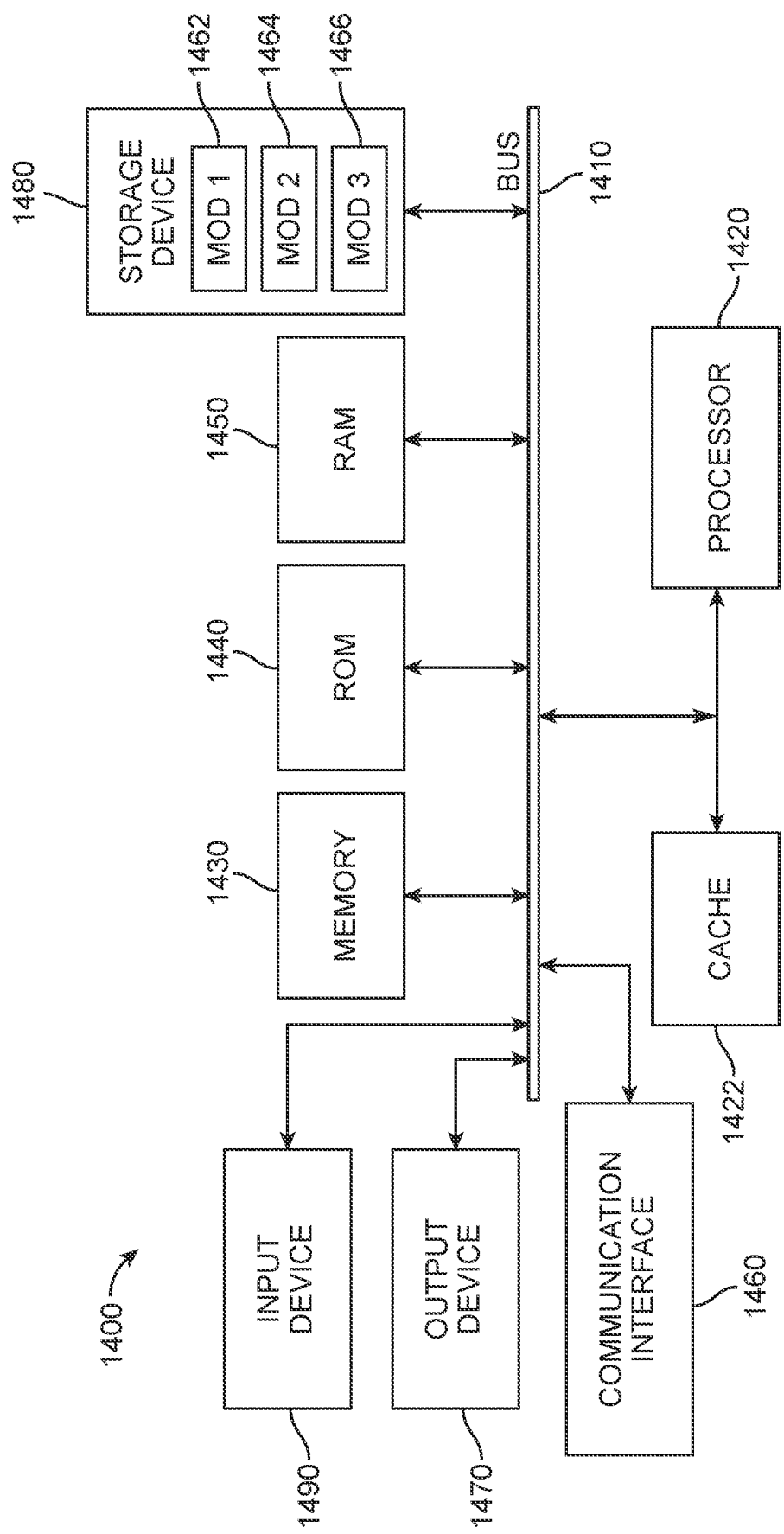
FIG. 14 illustrates an electronic device which can be employed to practice the concepts and methods of this disclosure.

FIG. 14 illustrates an electronic device 1400 (e.g., 100, 200) which can be employed to practice the concepts and methods described. The components disclosed described can be incorporated in whole or in part into tablet computers, personal computers, handsets and other devices utilizing one or more input devices 1490 such as microphones, keyboards, etc. As shown, device 1400 can include a processing unit (CPU or processor) 1420 (e.g., 206) and a system bus 1410 (e.g., 214). System bus 1410 interconnects various system components—including the system memory 1430 such as read only memory (ROM) 1440 and random-access memory (RAM) 1450—to the processor 1420. The bus 1410 connects processor 1420 and other components to a communication interface 1460 (e.g., 116) The processor 1420 can comprise one or more digital signal processors. The device 1400 can include a cache 1422 of high-speed memory connected directly with, near, or integrated as part of the processor 1420. The device 1400 copies data from the memory 1430 and/or the storage device 1480 to the cache 1422 for quick access by the processor 1420. In this way, the cache provides a performance boost that avoids processor 1420 delays while waiting for data. These and other modules can control or be configured to control the processor 1420 to perform various actions. Other system memory 1430 may be available for use as well. The memory 1430 can include multiple different types of memory with different performance characteristics. The processor 1420 can include any general-purpose processor and a hardware module or software module, such as module 1 (1462), module 2 (1464), and module 3 (1466) stored in storage device 1480, configured to control the processor 1420 as well as a special-purpose processor where software instructions are incorporated into the actual processor design. The processor 1420 may essentially be a completely self-contained computing system, containing multiple cores or processors, a bus, memory controller, cache, etc. A multi-core processor may be symmetric or asymmetric.

The system bus 1410 may be any of several types of bus structures including a memory bus or memory controller, a peripheral bus, and a local bus using any of a variety of bus architectures. A basic input/output system (BIOS) stored in ROM 1440 or the like, may provide the basic routine that helps to transfer information between elements within the device 1400, such as during start-up. The device 1400 further includes storage devices 1480 such as a hard disk drive, a magnetic disk drive, an optical disk drive, tape drive or the like. The storage device 1480 can include software modules 1462, 1464, 1466 for controlling the processor 1420. Other hardware or software modules are contemplated. The storage device 1480 is connected to the system bus 1410 by a drive interface. The drives and the associated computer readable storage media provide nonvolatile storage of computer readable instructions, data structures, program modules and other data for the device 1400. In at least one example, a hardware module that performs a function includes the software component stored in a non-transitory computer-readable medium coupled to the hardware components—such as the processor 1420, bus 1410, output device 1470, and so forth—necessary to carry out the function.

For clarity of explanation, the device of FIG. 14 is presented as including individual functional blocks including functional blocks labeled as a "processor." The functions these blocks represent may be provided using either shared or dedicated hardware, including, but not limited to, hardware capable of executing software and hardware, such as a processor 1420, that is purpose-built to operate as an equivalent to software executing on a general-purpose processor. For example, the functions of one or more processors presented in FIG. 14 may be provided by a single shared processor or multiple processors. (Use of the term "processor" should not be construed to refer exclusively to hardware capable of executing software.) One or more examples of this disclosure include microprocessor hardware, and/or digital signal processor (DSP) hardware, read-only memory (ROM) 1440 for storing software performing the operations discussed in one or more examples below, and random-access memory (RAM) 1450 for storing results. Very large-scale integration (VLSI) hardware embodiments, as well as custom VLSI circuitry in combination with a general-purpose DSP circuit can also be used.

The various examples described above are provided by way of illustration and should not be construed to limit the scope of the disclosure. Various modifications and changes can be made to the principles and examples described herein without departing from the scope of the disclosure and without departing from the claims which follow.

The invention claimed is:

1. A method for operating cameras in a cascaded network, comprising:
   capturing a first view with a first lens having a first focal point and a first centroid, the first view depicting a subject;
   capturing a second view with a second lens having a second focal point and a second centroid;
   detecting, based on audio captured using a plurality of microphones, a first location of the subject relative the first lens;
   estimating, based on the first location of the subject relative the first lens, a second location of the subject relative the second lens; and
   selecting, based on the estimate of the second location of the subject relative the second lens, a portion of the second view as depicting the subject.

2. The method of claim 1, further comprising:
estimating a first orientation of the subject relative the first lens;
estimating a second orientation of the subject relative the second lens;
determining that the second orientation is more closely aligned with a second line from the second centroid to the second focal point than is the first orientation aligned with a first line from the first centroid to the first focal point; and
rendering, responsive to the determination, the portion of the second view on a display,
wherein detecting the first location of the subject relative the first lens is further based on a face size corresponding to the subject, a head size corresponding to the subject, or both.

3. The method of claim 2, wherein rendering the portion of the second view on the display comprises transmitting image data corresponding to the portion of the second view to a remote endpoint coupled to the display.

4. The method of claim 2, wherein estimating the first orientation of the subject relative the first lens comprises applying a Kalman filter to prior orientation estimates for the subject relative the first lens.

5. The method of claim 1, wherein selecting the portion of the second view as depicting the subject comprises:
comparing first features of the subject within the first view to second features within the portion of the second view; and
determining, based on the comparison, that the second features within the portion of the second view correspond to the subject.

6. The method of claim 1, further comprising:
estimating a first orientation of the subject relative the first lens; and
determining that an angle of the first orientation formed with a first line from the first centroid to the first focal point exceeds thirty degrees,
wherein estimating the second location of the subject relative the second lens comprises estimating the second location of the subject responsive to determining that the angle so formed exceeds thirty degrees.

7. The method of claim 1, wherein detecting the first location of the subject relative the first lens comprises detecting the first location of the subject relative the first lens based on audio captured using a first array of microphones and a second array of microphones, wherein the first array of microphones is orthogonal to the second array of microphones.

8. A teleconferencing system, comprising:
a system camera comprising a first lens with a first focal point and a first centroid, the system camera configured to capture a first view containing a subject;
a plurality of microphones; and
a processor coupled to the system camera and the plurality of microphones, wherein the processor is configured to:
detect a first location of the subject relative the first lens based on audio captured using one or more microphones of the plurality of microphones;
receive, from a second camera, a video stream corresponding to a second view, the second camera comprising a second lens with a second focal point and a second centroid;
estimate, based on the first location of the subject relative the first lens, a second location of the subject relative the second lens; and
select, based on the estimate of the second location of the subject relative the second lens, a portion of the video stream as depicting the subject.

9. The teleconferencing system of claim 8, wherein the processor is further configured to:
estimate a first orientation of the subject relative the first lens;
estimate a second orientation of the subject relative the second lens;
determine that the second orientation is more closely aligned with a second line from the second centroid to the second focal point than is the first orientation aligned with a first line from the first centroid to the first focal point; and
render, responsive to the determination, the selected portion of the video stream using a display.

10. The teleconferencing system of claim 9, wherein the processor is further configured to render the selected portion of the video stream using the display by transmitting image data corresponding to the selected portion of the video stream to a remote endpoint coupled to the display.

11. The teleconferencing system of claim 9, wherein the processor is further configured to estimate the first orientation of the subject relative the first lens by applying a Kalman filter to prior orientation estimates of the subject relative the first lens.

12. The teleconferencing system of claim 8, wherein the processor is further configured to:
select the portion of the video stream as depicting the subject based on the estimate of the second location of the subject relative the second lens by:
comparing first features of the subject within the first view to second features within the portion of the video stream; and
determining, based on the comparison, that the second features within the portion of the video stream correspond to the subject.

13. The teleconferencing system of claim 8, wherein the processor is further configured to:
estimate a first orientation of the subject relative the first lens;
determine that an angle of the first orientation formed with a first line from the first centroid to the first focal point exceeds thirty degrees; and
estimate, responsive to determining that the angle so formed exceeds thirty degrees, the second location of the subject relative the second lens based on the first location of the subject relative the first lens.

14. The teleconferencing system of claim 8, wherein the plurality of microphones comprises a first microphone array and a second microphone array, and wherein the processor is further configured to:
detect the first location of the subject relative the first lens based on audio captured using the first microphone array and audio captured using the second microphone array,
wherein the first microphone array is orthogonal to the second microphone array.

15. A non-transitory computer readable medium storing instructions executable by a processor, wherein the instructions comprise instructions to:
capture a first view with a first lens having a first focal point and a first centroid, the first view depicting a subject;
capture a second view with a second lens having a second focal point and a second centroid;

detect, based on audio captured using a plurality of microphones, a first location of the subject relative the first lens;

estimate, based on the first location of the subject relative the first lens, a second location of the subject relative the second lens; and select, based on the estimate of the second location of the subject relative the second lens, a portion of the second view as depicting the subject.

16. The non-transitory computer readable medium of claim 15, wherein the instructions further comprise instructions to:

estimate a first orientation of the subject relative the first lens;

estimate a second orientation of the subject relative the second lens;

determine that the second orientation is more closely aligned with a second line from the second centroid to the second focal point than is the first orientation aligned with a first line from the first centroid to the first focal point; and render, responsive to the determination, the portion of the second view on a display, wherein the instructions to detect the first location of the subject relative the first lens further comprise instructions to:

detect the first location of the subject relative the first lens, based on a face size corresponding to the subject, a head size corresponding to the subject, or both.

17. The non-transitory computer readable medium of claim 16, wherein the instructions to render the portion of the second view on the display comprise instructions to transmit image data corresponding to the portion to a remote endpoint coupled to the display.

18. The non-transitory computer readable medium of claim 16, wherein the instructions to estimate the first orientation of the subject relative the first lens comprise instructions to apply a Kalman filter to prior orientation estimates for the subject relative the first lens.

19. The non-transitory computer readable medium of claim 15, wherein the instructions to select the portion of the second view as depicting the subject comprise instructions to:

compare first features of the subject within the first view to second features within the portion of the second view; and determine, based on the comparison, that the second features within the portion of the second view correspond to the subject.

20. The non-transitory computer readable medium of claim 15, wherein the instructions further comprise instructions to:

estimate a first orientation of the subject relative the first lens; and determine that an angle of the first orientation formed with a first line from the first centroid to the first focal point exceeds thirty degrees, and wherein the instructions to estimate the second location of the subject relative the second lens based on the first location of the subject relative the first lens comprise instructions to:

estimate the second location of the subject responsive to determining that the angle so formed exceeds thirty degrees.

21. The non-transitory computer readable medium of claim 15, wherein the instructions to detect the first location of the subject relative the first lens based on audio captured using the plurality of microphones comprise instructions to:

detect the first location of the subject relative the first lens based on audio captured using a first array of microphones and based on audio captured using a second array of microphones orthogonal to the first array of microphones.

\* \* \* \* \*